Feb. 7, 1939.  G. A. LANDIS  2,146,375
DENTAL FLOSS HOLDER
Filed Jan. 24, 1938
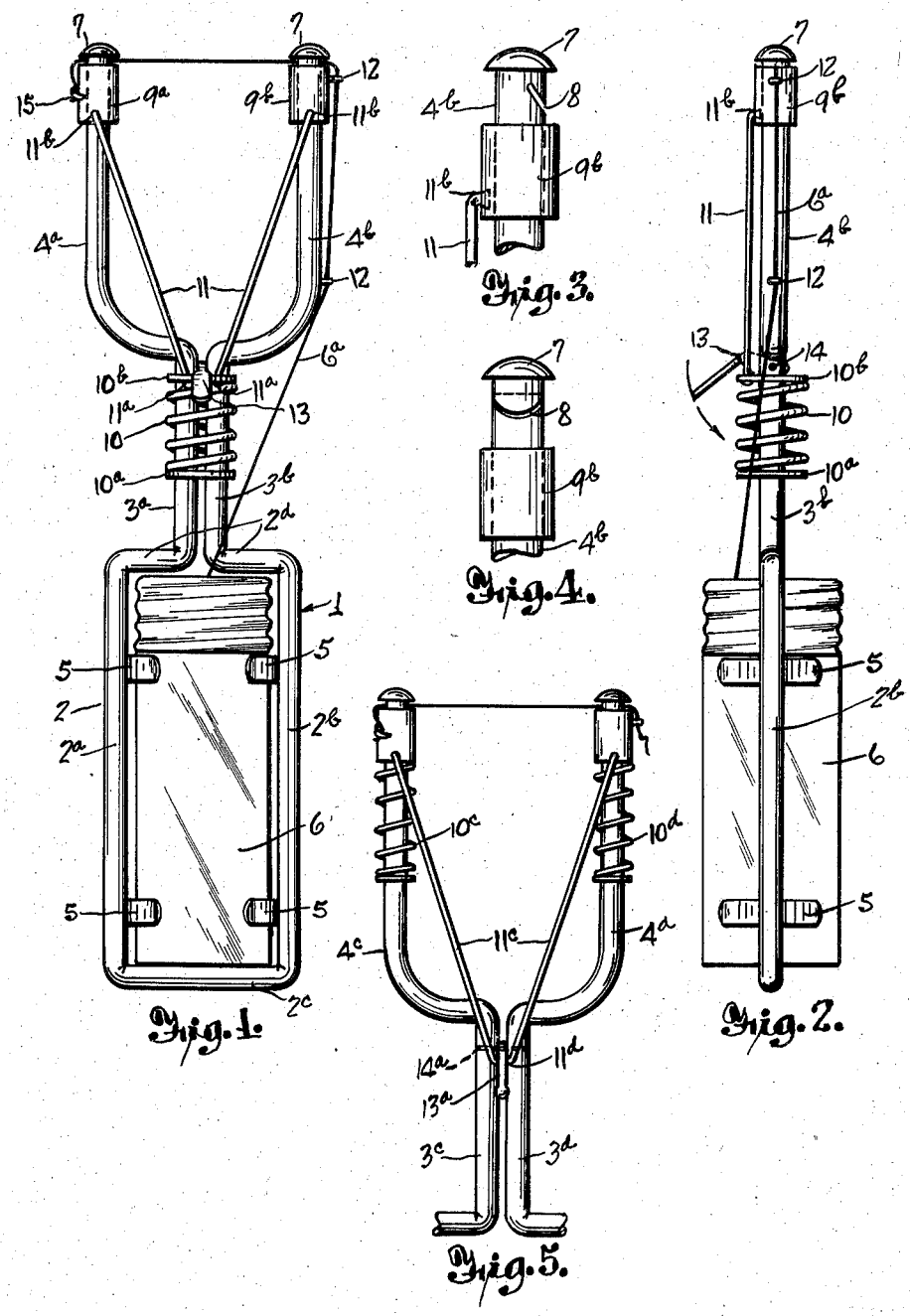
INVENTOR
GEORGE A. LANDIS
By Adam E. Fisher
ATTORNEY Patented Feb. 7, 1939

2,146,375

UNITED STATES PATENT OFFICE 2,146,375

DENTAL FLOSS HOLDER

George A. Landis, Hoquiam, Wash.

Application January 24, 1938, Serial No. 186,487

3 Claims. (Cl. 132—92)

This invention relates to dental floss holders for the use of dentists and people generally in holding in convenient and operative position a length of dental floss, for use in cleaning the teeth and clearing out matter lodged therein between.

The main object of the invention is to provide a forked form of such holder, the fork being supported on or extended from a handle in the form of an open frame wherein a spool or tube of dental floss may be mounted and a strand of the floss led therefrom up over the slotted extremities of the prongs of the fork and there locked in a taut position for use.

Another object is to provide in a floss holder of the kind referred to, an open frame-like handle wherein may be mounted a spool or tube of dental floss, the frame handle supporting a fork over the extremities of the prongs of which the strand of floss may be led, drawn taut and then locked ready for use, the extremities of the prongs being headed and slotted for engaging the strand of floss and there being sleeves slidably fitted over the said extremities below the heads thereof, said sleeves being spring actuated to close up over the said slots and against the heads of the prongs and thereby lock the strand of floss against slippage, there being means provided for withdrawing the sleeves for renewing the strand as desired, and separate means for cutting off the used strand as desired.

With the foregoing objects in view, attention is directed to the accompanying drawing as part of this specification, and wherein:

Figure 1 is a frontal elevation of the holder, showing a tube of floss mounted therein and ready for use.

Figure 2 is a side elevation of the assembly of Figure 1.

Figure 3 is an enlarged detail in side elevation of the end of one of the fork prongs, showing the mounting of the locking sleeve.

Figure 4 is a rear elevation of the detail shown in Figure 3.

Figure 5 is a frontal elevation of a modified form of the fork assembly, the handle being broken off.

In the embodiment shown in the drawing the floss holder is made of a single length of heavy wire 1 doubled upon itself to form an open handle 2 made up of the two side members 2a—2b spaced apart at bottom by the connecting member 2c, the two portions of the wire being brought together at the top as shown at 2d, then turned again outwardly in parallelism to form the shank 3a—3b, and finally being again flared apart at the ends to provide the fork prongs 4a—4b, this fork constituting the floss holder proper.

Spring clips 5 are mounted in spaced relation on the inner sides of the side members 2a—2b, and adapted to releasably engage a tube 6 of dental floss which may be readily sprung into place within the clips. The upper extremities of the fork prongs are headed over as shown at 7 and are also slotted obliquely upward through their rear sides immediately below these heads, as shown at 8. Sleeves 9a—9b are slidably mounted upon these extremities below the heads and are arranged to slide up over the slots or drawn down therefrom to expose same, as may be necessary in the operation of the device.

As shown in Figure 1 a coil spring 10 is mounted over the shank 3a—3b, the lower end thereof being anchored to a washer 10a which is rigidly fastened to the shank members, while the upper end of the spring is connected to a washer 10b which is free to slide up and down upon the shank. Small operating wires or rods 11 are anchored at 11a to the upper washer 10b and thence are flared up and out laterally and connected at their upper ends, one at each side, to the sleeves 9a—9b as represented at 11b. The arrangement is such that the normal action of the spring 10 is to force the sleeves 9a—9b up against the heads 7 and over the slots 8. Spaced eyes 12 are mounted on the outer sides of one of the prongs as shown at the right hand in Figure 1, and through which the strand of floss 6a is led from the tube 6 for threading the device, as will be later more fully explained.

A cam lever 13 is pivoted at 14 between the shank members 3a—3b immediately at the point where they diverge to form the prongs of the device, and this lever is arranged to have a bearing at its cam portion upon the washer 10b, so that by pressing down upon the lever the cam bears down upon the washer, thereby compressing the spring 10 and pulling the sleeves 9a—9b down so as to uncover the slots 8 of the prongs. Releasing the lever allows the sleeves again to return to their normal position up against the heads 7 and over the slots 8. A cutter 15 is mounted upon the outer side of the prong 9a.

In the operation of the device as described the strand 6a of floss is drawn up from the tube 6 and run through the eyes 12. The lever 13 is then depressed for drawing down the sleeves 9a—9b, after which the strand is led first through the slot 8 of the prong 4b and thence across through the slot 8 of the other prong 4a. The lever 13 is then released and the sleeves 9a—9b allowed to return to their normal position up against the heads 7, and in this movement they pass over the strand of floss in the slots or notches 8 and push this strand upward against the said heads 7, thereby both drawing the strand taut and at the same time locking same against slippage. The device is now ready for use. As a strand or length of the floss is used and ready to be discarded, it is drawn off laterally over the cutter 15 and cut away and a new length substituted therefor.

In the embodiment shown in Figure 5, in lieu of the single spring 10 mounted over the shank, two springs 10c—10d are employed and mounted singly over the prongs 4c—4d, and the operating wires or rods 11c are connected through a lower central bight 11d which engages the lever 13a pivoted at 14a between the members of the shank 3c—3d. The operation is the same as described for the preceding form.

While I have herein described a certain embodiment and structural features of the invention, it is understood that I may vary same in minor details, not departing from the spirit of the invention as defined in the appended claims.

I claim:

1. In a device of the kind described, a handle including means for holding a quantity of dental floss, a fork extended from the handle the prongs thereof being headed at their extremities and slotted immediately below the heads for engaging a strand of dental floss drawn up from the handle, sleeves slidably mounted over the extremities of the prongs immediately below the heads thereof and adapted to slide up against the heads of the prongs and over the said slots, spring actuated means for pressing the sleeves up against the said heads, and a lever for controlling the said spring actuated means.

2. In a device of the kind described, an open handle adapted for engaging a tube of dental floss, a fork extended from the handle the extremities of the prongs of the fork being headed and slotted below the heads for engaging a strand of the floss, sleeves mounted on the prongs to slide up against the heads thereof, spring actuated means for urging the sleeves up against said heads, means for withdrawing the sleeves from the heads to uncover the slots, eyes on one of the prongs of the fork for engaging a strand of the floss, and a cutter on the opposite side of the device for cutting the strand.

3. In a device of the kind described, a length of heavy wire doubled upon itself to form an open handle adapted to engage a tube of dental floss, a shank portion and a fork at the end of the shank portion, the extremities of the prongs of the fork portion being headed and slotted below the heads for engaging a strand of the floss led transversely therethrough, sleeves slidably mounted on the ends of the fork prongs to slide up against the said heads thereof, spring actuated means for urging the sleeves up against the heads, and means for withdrawing the sleeves from the heads.

GEORGE A. LANDIS.